(12) United States Patent
Adams

(10) Patent No.: US 8,326,534 B2
(45) Date of Patent: Dec. 4, 2012

(54) HOMING DISPLAY SYSTEM AND METHOD

(76) Inventor: Phillip M. Adams, Afton, WY (US)

(*) Notice: Subject to any disclaimer, the term of this patent is extended or adjusted under 35 U.S.C. 154(b) by 0 days.

(21) Appl. No.: 13/218,189

(22) Filed: Aug. 25, 2011

(65) Prior Publication Data

US 2012/0029820 A1 Feb. 2, 2012

Related U.S. Application Data

(63) Continuation of application No. 12/364,408, filed on Feb. 2, 2009, now Pat. No. 8,027,785, and a continuation of application No. 10/929,968, filed on Aug. 30, 2004, now Pat. No. 7,487,043.

(51) Int. Cl.
*G01C 21/16* (2006.01)

(52) U.S. Cl. .......... 701/500; 702/141; 114/315; 33/278; 367/141; 342/106; 342/107

(58) Field of Classification Search ............... 701/500; 73/178; 702/141; 114/315; 33/278; 367/141; 342/106, 107; *G01C 21/16*
See application file for complete search history.

(56) References Cited

U.S. PATENT DOCUMENTS

| | | | | |
|---|---|---|---|---|
| 6,052,654 | A * | 4/2000 | Gaudet et al. ............... 702/160 |
| 6,145,389 | A * | 11/2000 | Ebeling et al. ............... 73/865.4 |
| 6,176,837 | B1 * | 1/2001 | Foxlin ............................ 600/595 |
| 6,453,236 | B1 * | 9/2002 | Aoki .............................. 701/455 |
| 6,522,266 | B1 * | 2/2003 | Soehren et al. ............... 340/988 |
| 6,546,336 | B1 * | 4/2003 | Matsuoka et al. ............ 701/472 |
| 6,647,352 | B1 * | 11/2003 | Horton ........................... 702/151 |
| 7,400,956 | B1 * | 7/2008 | Feller et al. ..................... 701/41 |
| 7,623,961 | B2 * | 11/2009 | Van Den Broeck ........... 701/532 |
| 7,901,292 | B1 * | 3/2011 | Uhlir et al. ...................... 463/42 |
| 2001/0045128 | A1 * | 11/2001 | McCall et al. .................. 73/511 |
| 2002/0091482 | A1 * | 7/2002 | Eakle et al. .................... 701/207 |
| 2002/0105460 | A1 * | 8/2002 | Sladen ..................... 342/357.14 |
| 2003/0018430 | A1 * | 1/2003 | Ladetto et al. ................ 701/217 |
| 2003/0093201 | A1 * | 5/2003 | Schubert et al. ................ 701/46 |
| 2003/0146829 | A1 * | 8/2003 | Carlson et al. ................ 340/440 |
| 2004/0064286 | A1 * | 4/2004 | Levi et al. ...................... 702/141 |

FOREIGN PATENT DOCUMENTS

| | | | | |
|---|---|---|---|---|
| GB | 2388349 | A | * | 11/2003 |
| JP | 60256065 | A | * | 12/1985 |
| JP | 03179269 | A | * | 8/1991 |
| JP | 10067294 | A | * | 3/1998 |
| WO | WO 9724582 | A1 | * | 7/1997 |

* cited by examiner

*Primary Examiner* — Tuan C. To
(74) *Attorney, Agent, or Firm* — Pate Baird, PLLC

(57) ABSTRACT

A relative positioning system enabling a user to return to a starting position or some other point on the user's path. The system may include an array of accelerometers. The output from the accelerometers may be integrated to quantify movement of the array. The various movements of the array may be reconstructed to determine a net two or three dimensional translation. The current location of the array may be compared to a reference point to derive at trajectory directing the user to the reference point, such as an originating point. The trajectory may be continuously or periodically updated. Applications may include various displays presenting images, numbers, pointers, paths, vectors, or data by digital screens, watch faces, or other devices integrated with or remote from the processor calculating the vector back to the point of origin.

20 Claims, 10 Drawing Sheets

HOMING DISPLAY SYSTEM AND METHOD

RELATED APPLICATIONS

This application is a continuation of U.S. patent application Ser. No. 12/364,408 filed Feb. 2, 2009 now U.S. Pat. No. 8,027,785 and U.S. patent application Ser. No. 10/929,968 filed Aug. 30, 2004, now U.S. Pat. No. 7,487,043 both of which are incorporated herein by reference in their entirety.

BACKGROUND

1. The Field of the Invention

This invention relates to relative positioning systems, and more particularly to apparatus and methods using accelerometers to quantify changes in position.

2. The Background Art

Scuba-diving is an exhilarating and dangerous pastime. The development of underwater breathing capability (e.g. Self-Contained Underwater Breathing Apparatus or SCUBA) has opened up a new world underneath the ocean. However, a scuba diver is venturing into an alien world for which he is ill suited. In particular, determining relative position underwater presents many challenges not present when orienting oneself on land. Both ocean water and lake water typically contain quantities of particulate matter that limit visibility. In addition, water is generally impervious to radio waves. Accordingly, visual positioning techniques and radio frequency based Global Positioning System (GPS) are not available underwater. Use of magnetic compasses likewise is made impossible by the inability to take bearings from reference points due to low visibility. Relative positioning by compass also requires an individual to evaluate how far one has traveled and in what direction. However, this approach is made impossible by underwater currents. A diver carried along by a current will have an inaccurate perception of how far he or she has actually traveled.

Determining relative position underwater is extremely critical. A scuba diver in the open ocean must be able to return to the boat or be lost at sea. A diver in a cave must be able to find his or her way out. Time is also critical, inasmuch as a diver must return to a point of origin before running out of air.

Accordingly, what is needed is a relative positioning system (RPS) enabling a diver to return to a point of origin without reliance on visual or other land-oriented guidance mechanisms. Additionally, what is needed is a system able to track a diver's movements and provide a trajectory pointing to a point of origin.

BRIEF SUMMARY OF THE INVENTION

In view of the foregoing, it is a primary object of the present invention to provide a system, method, and apparatus for determining relative position underwater. An array of accelerometers fixed with respect to one another may detect acceleration in sufficient orthogonal directions to accurately describe the movements of the array when the accelerations are doubly integrated. In some embodiments, acceleration in longitudinal, transverse, and lateral directions may be detected, as well as rotational acceleration about axes extending in the longitudinal, transverse, and lateral directions. The array may be mounted on a wrist-based computer, or be mounted to a computer secured to an article of standard scuba gear.

An electronic device, such as a small computer, may integrate the output of the accelerometers to transform the output from a representation of acceleration to a representation of velocity. Velocity integrates likewise to translation. The integrated output is then interpreted or transformed to derive a description of the current three dimensional position of the array.

A trajectory may be calculated based on a current (present) position and an objective point. The objective point may be automatically chosen to be the starting point. Alternatively, an objective point may be chosen from a series of reference points. A user may instruct the electronic device that the current position of the array is to be designated as a reference point. A diver may then move to or return to that position by setting the reference point as the objective point.

An electronic device may have a display capable of graphically representing the trajectory to a user. For example, an arrow may be displayed pointing the way to an objective point. An image of the entire trajectory may also give a user a more global view of one's circumstance. This may be toggled with a presentation of the vector in a suitable display.

BRIEF DESCRIPTION OF THE DRAWINGS

The foregoing and other objects and features of the present invention will become more fully apparent from the following description, taken in conjunction with the accompanying drawings. Understanding that these drawings depict only typical embodiments in accordance with the invention and are, therefore, not to be considered limiting of its scope, the invention will be described with additional specificity and detail through use of the accompanying drawings in which.

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of systems and methods in accordance with the present invention, as represented in FIGS. 1 through 12, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
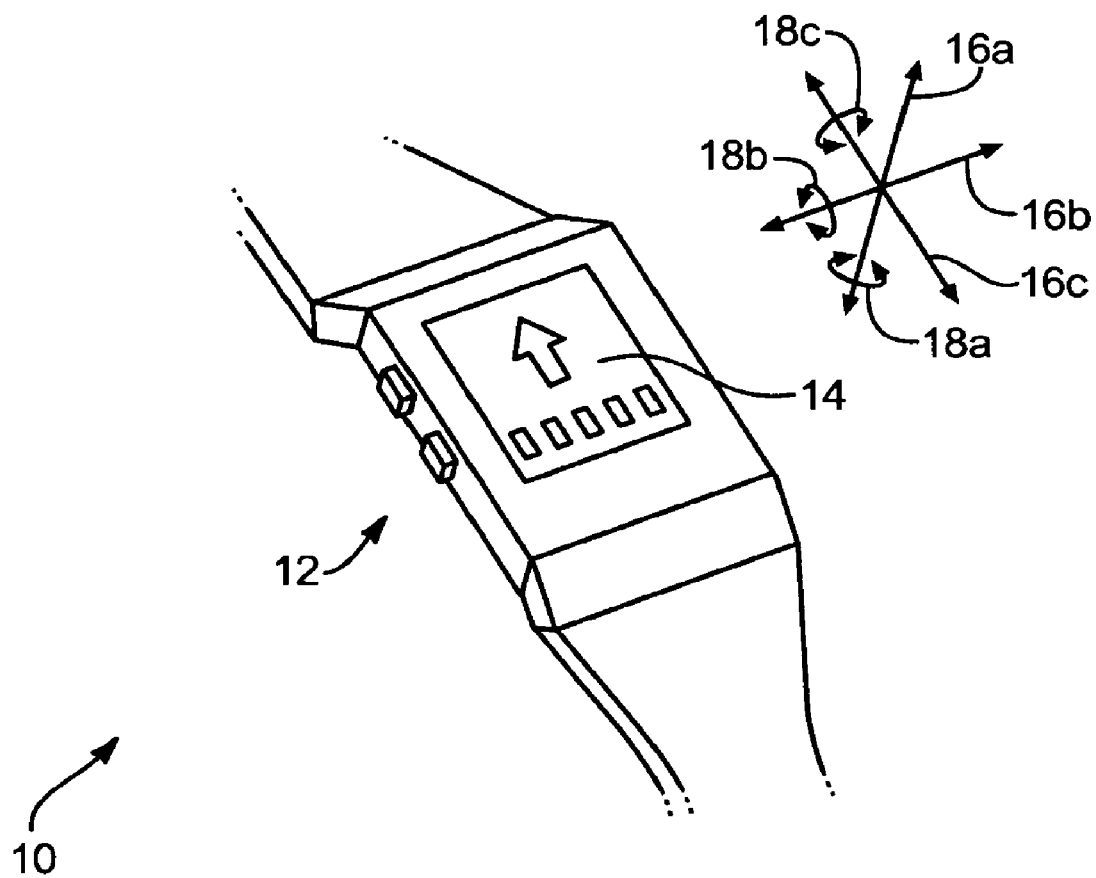
FIG. 1 is a perspective view of a watch-based computer hosting a relative positioning system, in accordance with the invention.

Referring to FIG. 1, a relative positioning apparatus 10 for use underwater or elsewhere may include a computer 12. The computer 12 may be wrist-mounted or be otherwise packaged to enable the computer 12 to be remain submerged and independently powered. In some embodiments, the computer 12 may be incorporated within a dive computer typically used to inform divers of critical dive parameters. The computer 12 will typically include an LCD 14, or like display for presenting information to a user.

An apparatus 10 may track acceleration in the number of degrees of freedom (e.g. directions) necessary to track a diver's movements. In some instances these directions may include a transverse direction 16a, a lateral direction 16b, and a longitudinal direction 16c. It will be noted that the directions 16a-16c are defined with respect to the computer 12. Rotational directions 18a-18c, may be defined as rotation about axes parallel to the directions 16a-16c, respectively. The directions 16a-16c may be mutually orthogonal to one another. It will also be noted that any definition of translational and rotational directions may be used provided they are sufficient to uniquely identify the position and orientation of the computer 12.

Figure 2:
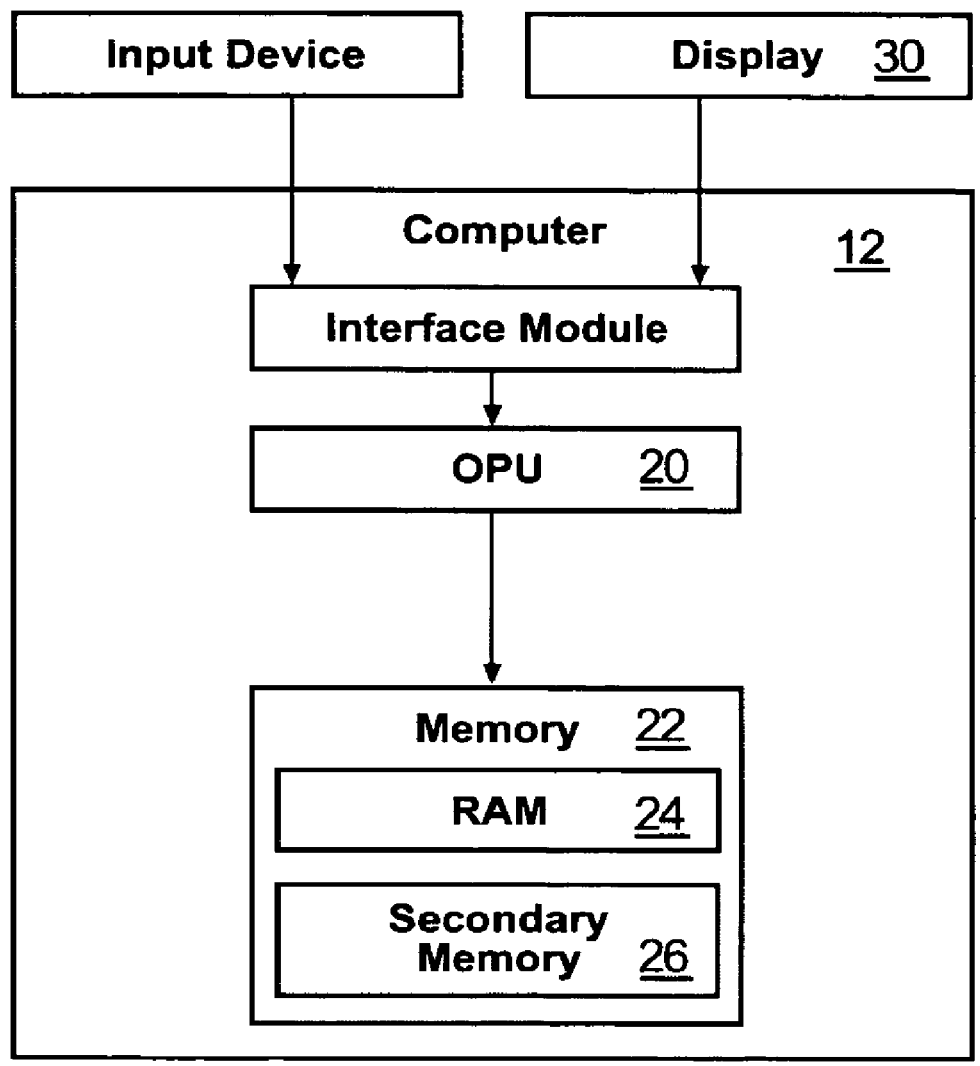
FIG. 2 is a schematic block diagram of one embodiment of a computer in accordance with the invention.

Referring to FIG. 2, in some embodiments a computer 12 may include a processor 20 for executing instructions, processing inputs, and producing output data. A memory 22 may connect to the processor 20 to store executable and operational data. A memory 22 may include volatile RAM 24 as well as long term secondary memory 26, such as flash memory or a hard drive. The computer 12 may include an input device 28 such as buttons or the like to enable a user to input user defined parameters to the computer 12. Likewise a display 30 may enable the processor 18 to display data to a user. A display 30 may include an LCD 14, or other video or audio output devices. A signal processor 32 may be dedicated to processing analog signals, performing such functions as filtering or making analog-to-digital conversions or vice versa.

Figure 3:
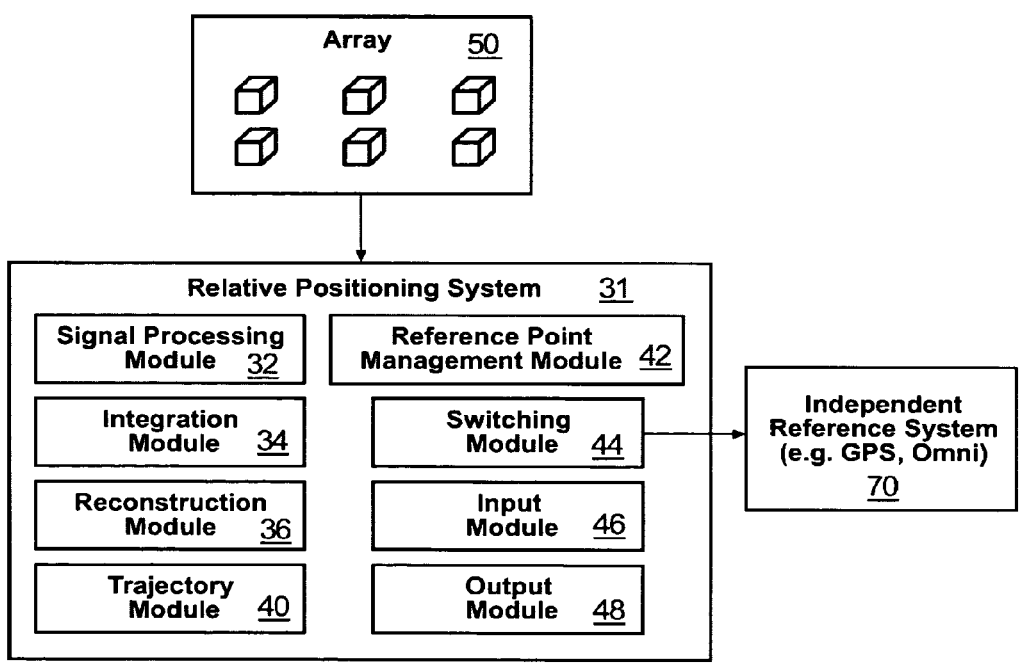
FIG. 3 is a schematic block diagram of a relative positioning system in accordance with the invention.

Referring to FIG. 3, a computer 12 may execute the modules forming a relative positioning system 31. The modules forming the relative positioning system 31 may be formed as digital or analog circuits. Alternatively, the modules forming the relative positioning system 31 may represent computer executables (i.e. executable data) processed by the processor 20.

A relative positioning system 31 may include a signal processing module 32, an integration module 34, a reconstruction module 36, a storage module 38, a trajectory module 40, a reference point management module 42, a switching module 44, an input module 46 and an output module 48. The input module 46 may receive user instructions directing the operation of the system 31. For example, buttons, wireless communication links, or other data input means may be used. Likewise, an output module 48 may be a liquid crystal display (an LCD) 14, a wireless communication link to an external device, or some other means of outputting data.

An array 50 of accelerometers may be electrically connected to a data acquisition system or other similar computer 12, supplying information thereto relating to the accelerations experienced by the array 50. The output of the array 50 may be input to the signal processing module 32. The signal processing module 32 may filter the output of the array 50 to eliminate noise and otherwise condition the output to compensate for unwanted components of the output signal.

An integration module 34 may convert the output of the accelerometers from a signal representing acceleration to a signal representing velocity, displacement, or both. The integration module 32 may perform this function by numerically integrating the conditioned signal. A first integration of the signal will yield velocity whereas a second integration will yield a displacement.

A reconstruction module 36 may reconstruct a three dimensional path based on the integrated signal. An array 50 may output signals measuring acceleration corresponding to the six degrees of freedom necessary to describe the position and orientation of an object in three dimensional space (i.e. lateral, transverse, and longitudinal translation and rotation about the lateral, transverse, and longitudinal axes). Accordingly, the integrated signal may be converted by the reconstruction module 36 into a description of the acceleration, velocity, and displacement of the accelerometers in three dimensional space as well as the rotations experienced by the accelerometers.

A storage module 38 may store such things as the current three-dimensional position and orientation of the array 50, the three dimensional position and orientation of the array 50 at a prior point in time that is significant (e.g. the starting position of the diver or one or more way points specified by the diver), or other points along the path followed by the array 50. The storage module 38 may automatically store such points or store points as instructed by the user. For example a diver may instruct the storage module 38 that a specific point (e.g. the current position of the array 50) is to be saved as a way point. In some embodiments, the storage module 38 may store points based on the length of the path traveled or the amount of time that has passed (e.g. store a point every twenty feet or every 30 seconds). The length of time passed and distance traveled may be specified by a user or be either fixed or chosen automatically.

Figure 4:
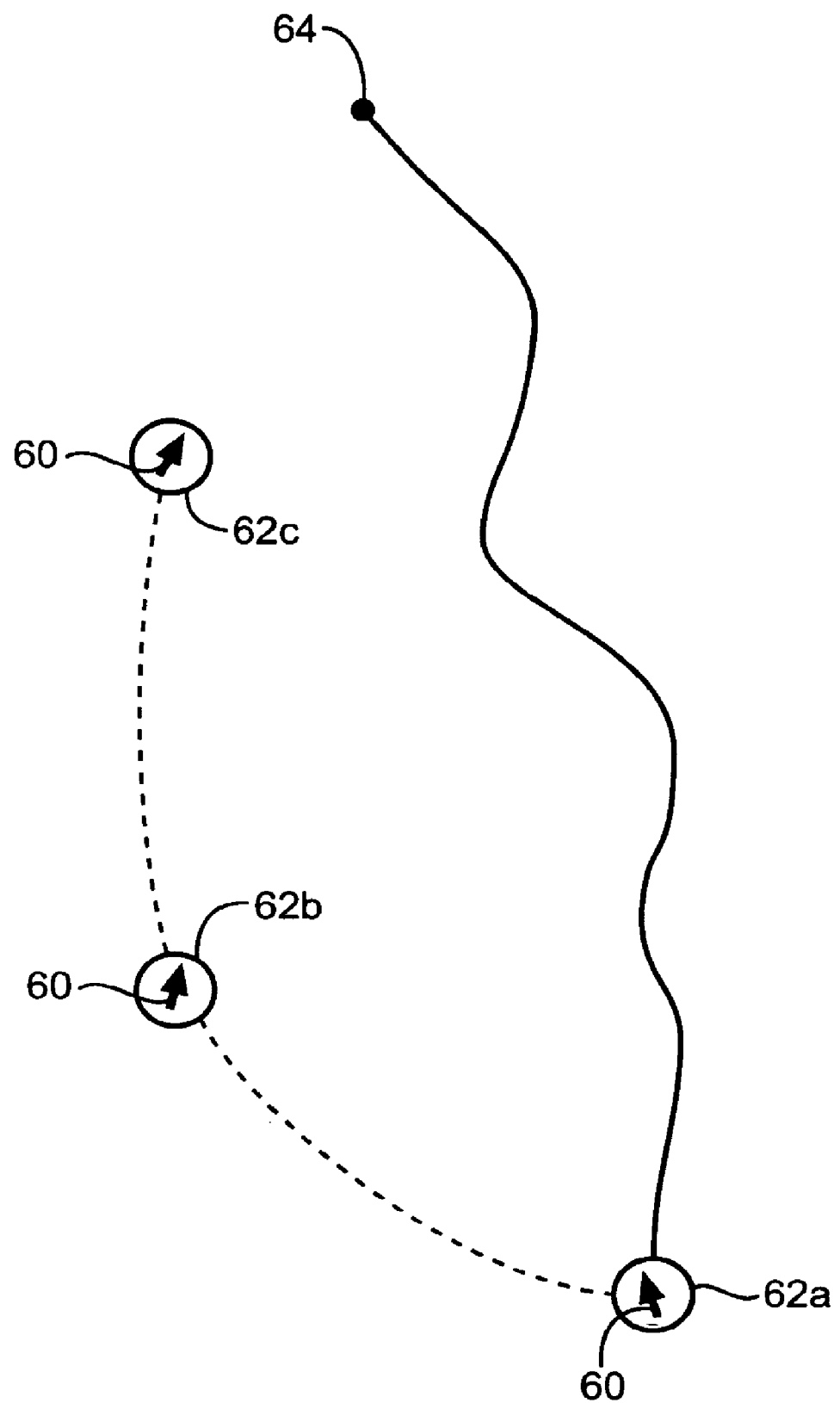
FIG. 4 is a schematic diagram illustrating the operation of a relative positioning system in accordance with the invention.
Figure 5:
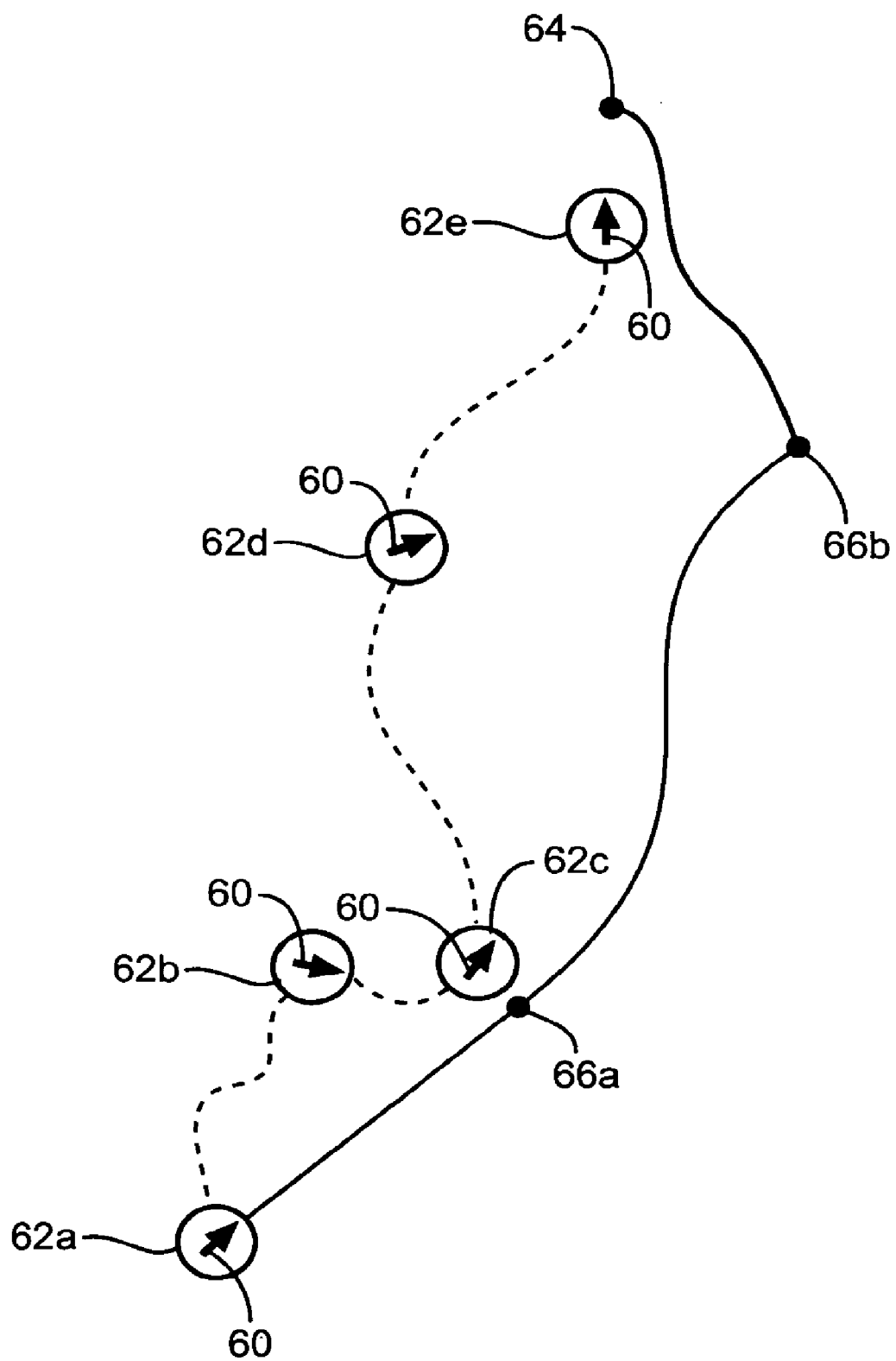
FIG. 5 is a schematic diagram illustrating an alternative mode of operation of a relative positioning system in accordance with the invention

Referring to FIG. 4, while still referring to FIG. 3, A trajectory module 40 may compute a vector 60 indicating a trajectory of some interest for a user. It will be noted that although FIGS. 4 and 5 illustrate a two dimensional path, the trajectory may also represent a three dimensional vector. The trajectory module 40 may evaluate the current position 62a of the array 50 and a starting point 64 stored in the storage module 38. The trajectory module 40 may calculate a corresponding vector 60 pointing from the current position 62a of the array 50 to the starting point 64 or another selected point of significance. As a user moves from a point 62a to a point 62b or 62c, the trajectory module 40 may update the vector 60 to point from the point 62b, 62c to the starting point 64 as the user moves from point 62a to points 62b and 62c.

Referring to FIG. 5, while still referring to FIG. 3, Alternatively, a user may specify that the vector 60 to be calculated shall point from a current position 62a-62e to any of a number of saved way points 66a, 66b. In some embodiments, the trajectory module 40 may calculate a trajectory from the current position 62 to a point a standardized distance from the current position. For example, the trajectory module 40 may be programmed to constantly update the trajectory to point to a point on the reconstructed path 20 feet (or some other distance) from the current position. In this manner, the trajectory module 40 may aid a user to substantially retrace a path.

In order to facilitate precise retracing the trajectory module 40 may calculate a trajectory or a curve fit that approximates a tangent line, polynomial or other reconstructed path calculated at, near, or through the points on the path closest to the series of current positions of a user and indicating the direction to be followed to retrace the original path. That is, a path may include an original path and a return path. A user may specify to the computer 12 at some point that he is returning, thus defining subsequent additions to the path as the return path. When calculating a tangent or other curve-fit trajectory, the trajectory module 40 may use the position on the original path closest to the return path. Numerical methods and filtering may provide a shortened, smoothed, or otherwise improved return path.

A reference point management module 42 may enable a user to identify reference points that are to be stored and select which of stored reference points are to be used by the trajectory module 40. For example, a user may press a button, or otherwise provide inputs to instruct the computer 12, and cause that current position of the array 50 to be stored as a reference point. A user may repeatedly store points as reference points. When a user wishes to retrace a path the reference point management module 42 may present a list of reference points, e.g. reference points 66a, 66b, and allow a user to select which points are to be used by the trajectory module 40 to calculate a vector 60, return path, or the like.

In some embodiments, the reference point management module 42 may automatically select which of the stored reference points 66a, 66b is to be used to calculate a vector 60. For example, the reference point management module 42 may march through the reference points 66a, 66b, with the last reference point created used first by the trajectory module 40. When a user approaches the location of the last reference point, the reference point management module 42 may then select the next to last reference point to calculate a new trajectory, and so on for multiple stored reference points. For example, when a user comes within a specified distance of reference point 66a, the reference point management module 42 may automatically select reference point 66b for use in calculating the vector 60. In some embodiments, a reference point management module 42 may be instructed by a user, pre-programmed, or hard wired to select the reference point 66a, 66b, or starting point 64 based on proximity. For example at point 62d, the reference point management module 42 may calculate that point 62d is closer to reference point 66b and therefore select reference point 66b to calculate the vector 60.

Figure 6:
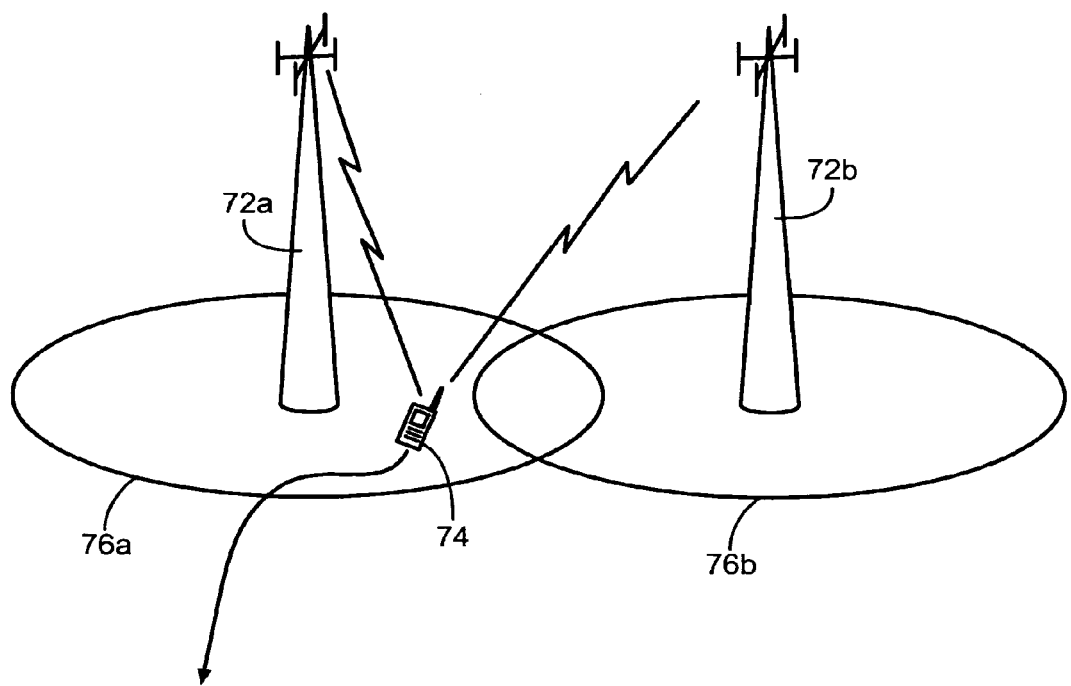
FIG. 6 is an illustration of the operation of a switching module in accordance with the invention.

Referring to FIG. 6, while still referring to FIG. 3, a switching module 44 may manage interaction between the system 12 and an independent reference system 70. An independent reference system 70 may include a global positioning system (GPS), radio frequency beacon system (e.g. OMNI), or the like. In the illustrated embodiment, cell phone towers 72a and 72b may be used to determine the position of a cellular phone 74, or like device.

However, radio waves may be unavailable in some circumstances. For example, a diver will be unable to receive radio frequency signals under water. Likewise, a cell phone user who travels outside of the service coverage areas 76a, 76b of available cell phone towers 72a, 72b or is blocked therefrom will not be able to use radio contact to determine position.

Accordingly, a switching module 44 may detect when an independent reference system 70 is unavailable and prompt the other modules forming the relative positioning system 31 to function as describe hereinabove. For example, a switching module 44 may detect the weakening or disappearance of radio signals and begin tracking a user's position using the signals from the accelerometer array when the intensity of radio signals falls below a certain threshold. A switching module 44 may likewise detect when the signal intensity of an independent reference system 70 is above a certain threshold and revert to the use of the system 70 or simply re-calibrate distances for correction using the system 70.

Figure 7:
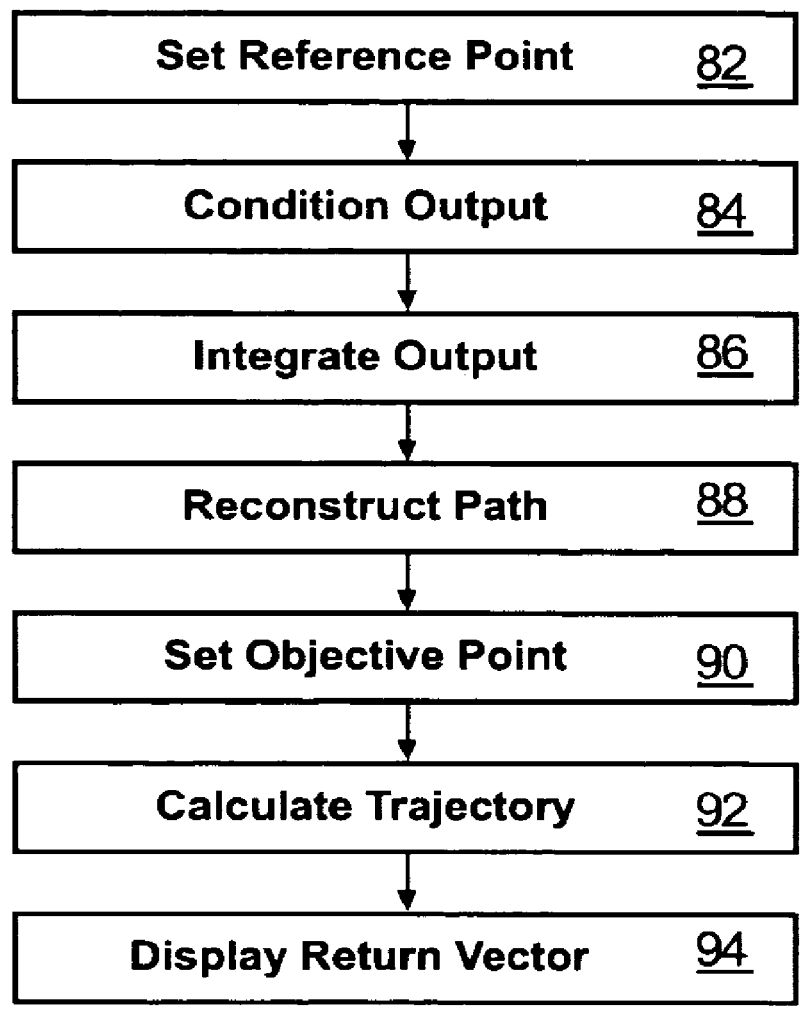
FIG. 7 is a process flow diagram of a method for determining relative position in accordance with the invention.

Referring to FIG. 7, a method 80 for using a relative positioning system 31 may include setting 82 a reference point. Setting 82 a reference point may include storing sufficient data to define a point in three dimensional space based. Setting 82 a reference point may also include storing an orientation of the array 50. In some embodiments, a first reference point may be presumed to be the point at which a relative positioning system 31 is first engaged or powered on. Accordingly, subsequent tracking of the movements of the array 50 will "set" 82 the reference point as simply the point of origin of the reconstructed path.

A method 80 may include conditioning 84 the output of the array 50. Conditioning 84 may include removing noise and other artifacts from the signal output by the array 50. Conditioning 84 the output of the array 50 may be performed prior to integration of the output and prior to reconstruction of the path. Alternatively, the integrated output or the reconstructed path may be smoothed, filtered, or both. In some embodiments, conditioning 84 may be performed by one or more of the output of the array 50, the integrated output, and the integrated path.

A method 80 may include integrating 86 the output. Integrating 86 may include using numerical integration techniques to integrate the output signal of the array 50. The integration 86 may be performed using analog electronics or by converting the output of the array 50 into a digital data and performing the integration programmatically or through digital logic circuits.

A method 80 may include reconstructing 88 a path followed by the array 50. Reconstruction may include interpreting the integrated output to reconstruct the path. The integrated output may be interpreted as rotations and displacements, which may be interpreted to reconstruct a three-dimensional path followed by the array. The three dimensional path may also include a history of the rotations experienced by the array 50. Again, the path may be smoothed to any desired degree by curve fitting.

A method 80 may include setting 90 an objective point, the objective point may be automatically set to be a starting point or first point on a reconstructed path. Alternatively, a reference point, whether created by a user or automatically, may be set 90, whether automatically or manually, to be an objective point.

A method 80 may include calculating 92 a trajectory. Calculating 92 a trajectory may include calculating a vector pointing from the current location of the array 50 to the objective point chosen in step 90. The vector may be displayed 94 on the LCD 14 of the computer 12, or transmitted to another device and displayed 94. For example, an arrow pointing to the objective point may be displayed on an LCD of a watch-based computer 12.

Figure 8:
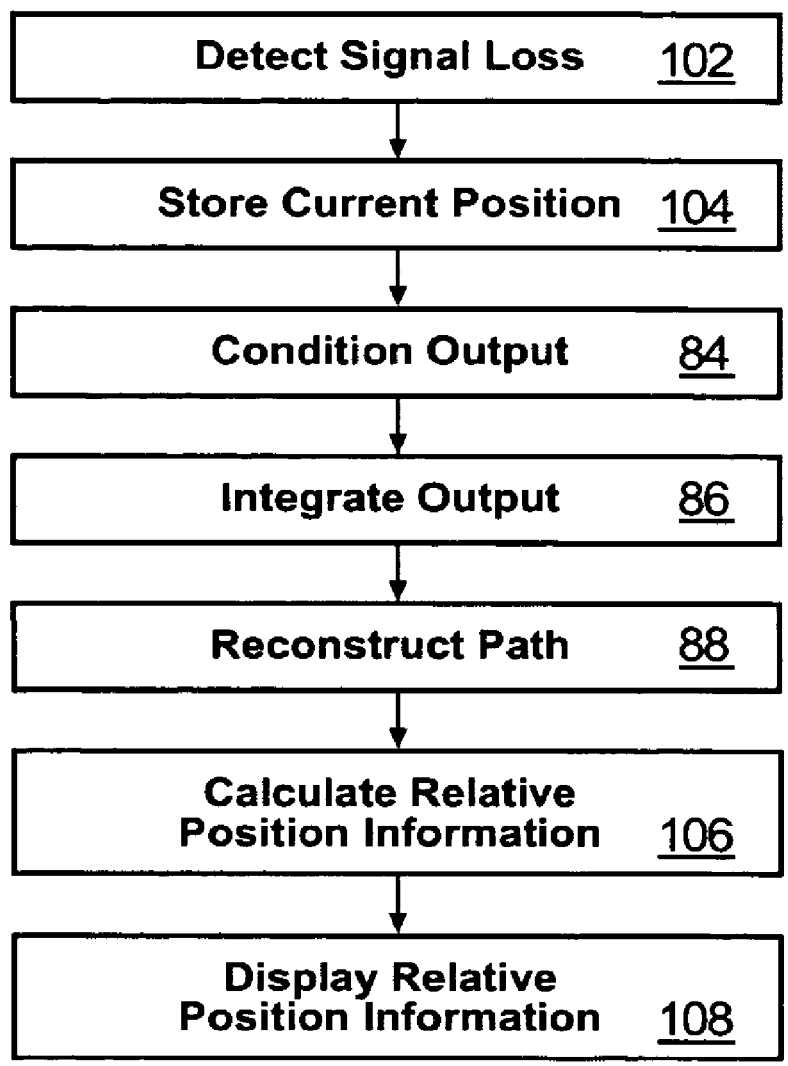
FIG. 8 is a process flow diagram of a method for determining relative position using a switching module in accordance with the invention.

Referring to FIG. 8, a method 80 may have various alternative embodiments. In the embodiment of FIG. 8, the method 80 is used to determine relative position in regions where independent reference systems 70 are unavailable. A method 80 may include detecting 102 signal loss. Detecting 102 signal loss may include detecting when reception of a signal is so poor as to render reliance on the signal improper. Detecting 102 signal loss 102 may include measuring the intensity of the carrier wave transmitting a signal and comparing the intensity to a predetermined value. Likewise, relative variation in signal intensity may be used in addition or instead.

The method 100 may include storing 104 the current position of the array 50 at, or near, the time when the signal loss is detected 102. In some embodiments, the current position of the array 50 may be constantly and repeatedly stored on some schedule, such that when the signal loss is detected 102, one or more accurate locations will be preserved. Storing 104 the current position of the array 50 may also include storing the orientation of the array 50. The steps of conditioning 84 the output, integrating 86 the output, and reconstructing 88 a path may be performed as described hereinabove in order to track subsequent movements of the array 50.

A method 80 may be further modified to include calculating information 106 relating to relative position and may include using the reconstructed path and the location stored in step 104 to provide information to a user relating to relative position. For example, a user's location with respect to a map of an area may be identified. Displaying 108 relative position information may include displaying to a user the information calculated in step 106. For example, a digital representation of a map with markings indicating a user's location may be displayed. This may provide not just a vector instructing which direction to move, but perspective and context. Moreover, the vector, destination, path, or all of the above may be displayed schematically or to scale on a compass grid, Cartesian coordinate grid, polar coordinate grid, or the like.

Figure 9:
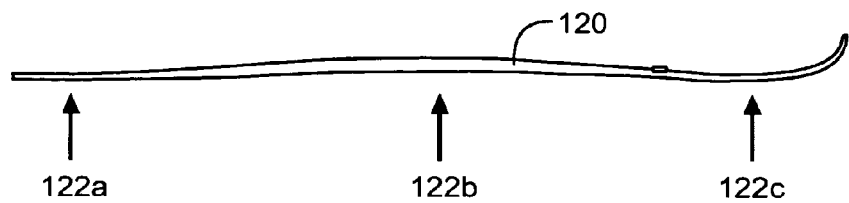
FIG. 9 is a side elevation view of a ski in accordance with the invention.

Referring to FIG. 9, a relative positioning system 31 may be used in conjunction with a ski 120, snow board 120, wristwatch, hand held device, or other type of recreational equipment, such as a surf board, skate board, bicycle, backpack, or the like. Such an integrated device will ensure that the sportsman can always return to a known point without fear of becoming lost. On land or water, a user can backtrack, beeline, or jink around obstacles, yet a relative positioning system 31 in accordance with the present invention will always indicate the correct direction toward "home" (e.g. a reference point 66 of particular interest or importance).

Additionally, a relative positioning system 31 may calculate the distance between a current position 60 and a reference point 66. Summing or integrating in each dimension can provide net distances in two or three dimensions. Thus, one may always know the direction and distance "home" to a starting point or a destination. A relative positioning system 31 may be operative in two or three dimensions and be incorporated into sporting equipment, a wristwatch, hand held device, or the like. Additionally, a relative positioning system 31 may secure directly to, or be incorporated as an integral part of, a ski 120, snow board 120, bicycle, backpack, and the like for all the functionality discussed hereinabove.

Furthermore, when skiing, for example, one's weight distribution on the skis may be critical to correctly execute turns and like maneuvers. Changes in weight distribution may be accompanied by changes in the relative position of points 122a-122c along the length of the ski. For example, if a skier's weight is shifted forward, the point 122c may shift upward. In some instances, torsional flexing of the ski may also be reflective of weight distribution or otherwise important to examine a user's technique. Thus, an apparatus 10 in accordance with the invention may provide comparisons of minute variations in timing, acceleration, speed, and position for diagnostics and training.

Accordingly, a relative positioning system 31 may be used to monitor the motion of the points 122a-122c. Tracking the motion of the points 122a-122c may enable a user to reconstruct a model of the motion of the ski in order to give feedback to skiers regarding their weight distribution, velocity, turning technique, timing, stance, positioning and the like.

Figure 10:
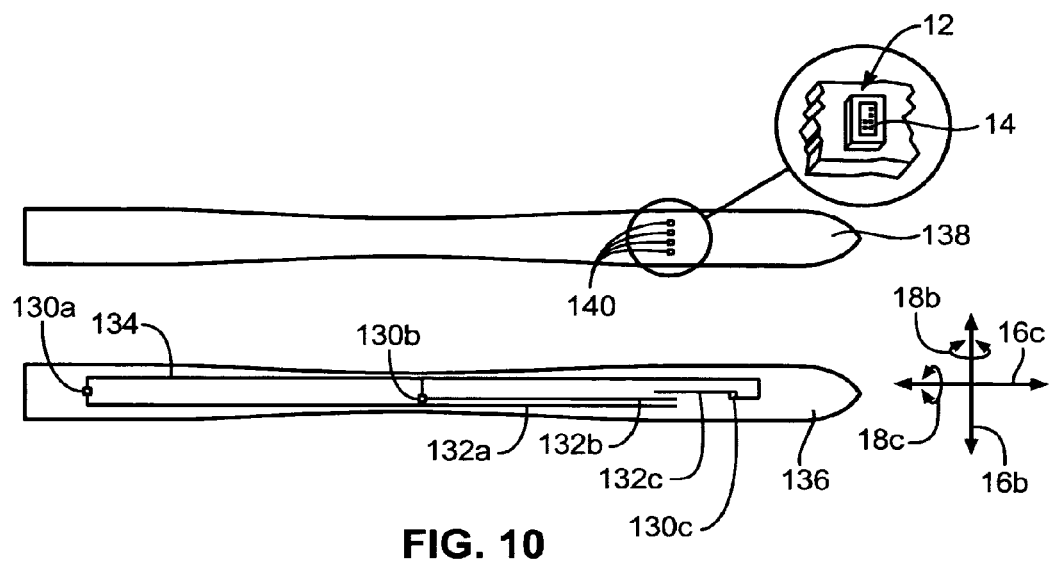
FIG. 10 is a top plan view of an embedded accelerometer array in accordance with the invention.
Figure 11:
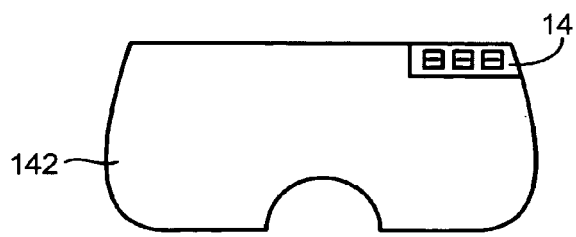
FIG. 11 is a front elevation view of a mask having a LCD display mounted thereon in accordance with the invention.

Referring to FIG. 10, the array 50 of accelerometers may include three or more distinct arrays 130a-130c. The arrays 130a-130c may detect acceleration in at least one dimension. For example, the arrays 130a and 130c may detect acceleration corresponding to transverse acceleration only, inasmuch as upward deflection of the tip and tail of the ski may be of interest. An array 130b may detect acceleration in all six degrees of freedom in order to provide an accurate description of the motion of the skier. In some embodiments, each array 130a-130c may detect motion in multiple directions. For example, arrays 130a, 130c may also detect rotation in rotational direction 18c in order to track torsion of the ski.

Arrays 130a-130c may connect to serial wires 132a-132c to communicate the output of the arrays 130a-130c to other devices. A wire 134, or plate may likewise connect the arrays 130a-130c to another device. The wires 132a-132c, 134 may be positioned between a lower layer 136 and an upper layer 138 of laminate layers forming the ski 120. Apertures 140, or an aperture 140, may be formed in the upper layer 138 to enable access to the wires 132a-132c. A computer 12 may secure to the ski 120 or other recreational member 120 near the apertures 140 and receive the outputs from the arrays 130a-130c.

In some embodiments, the LCD 14 of the computer 12 may display data calculated by the relative positioning system 31 such as velocity, distance traveled, or the like. In some embodiments, the computer 12 may transmit the output of the arrays 130a-130c, or data calculated using the arrays 130a-130c to an external device using wireless communication transmitters and receivers. In some embodiments, the computer 12 may simply store the output, or the result of operations executed on the outputs, in its RAM 24 or secondary memory 26 to be retrieved later. It will be noted that the computer 12 may be positioned on the ski 120 or in some other location. The output of the arrays 130a-130c may simply be stored or transmitted to a computer 12 located on the skier's person or elsewhere Referring to FIG. 11, in some embodiments, the output of calculations may be displayed on a mask 142 worn by a user. Using LEDs, LCDs or other display technology, a user may move a display area of a face mask, or a "heads-up" display on a part of the mask. For example, an LCD 14 may be positioned on the mask 142. Alternatively, graphical representations of data may be projected onto the mask 142 for viewing by the user. In some embodiments, the computer 12 may also secure to the mask 142 and receive the output of the arrays 130a-130c from a wireless transmitter secured to the ski 120 or from wires extending from the ski 120 to the mask 142.

Figure 12:
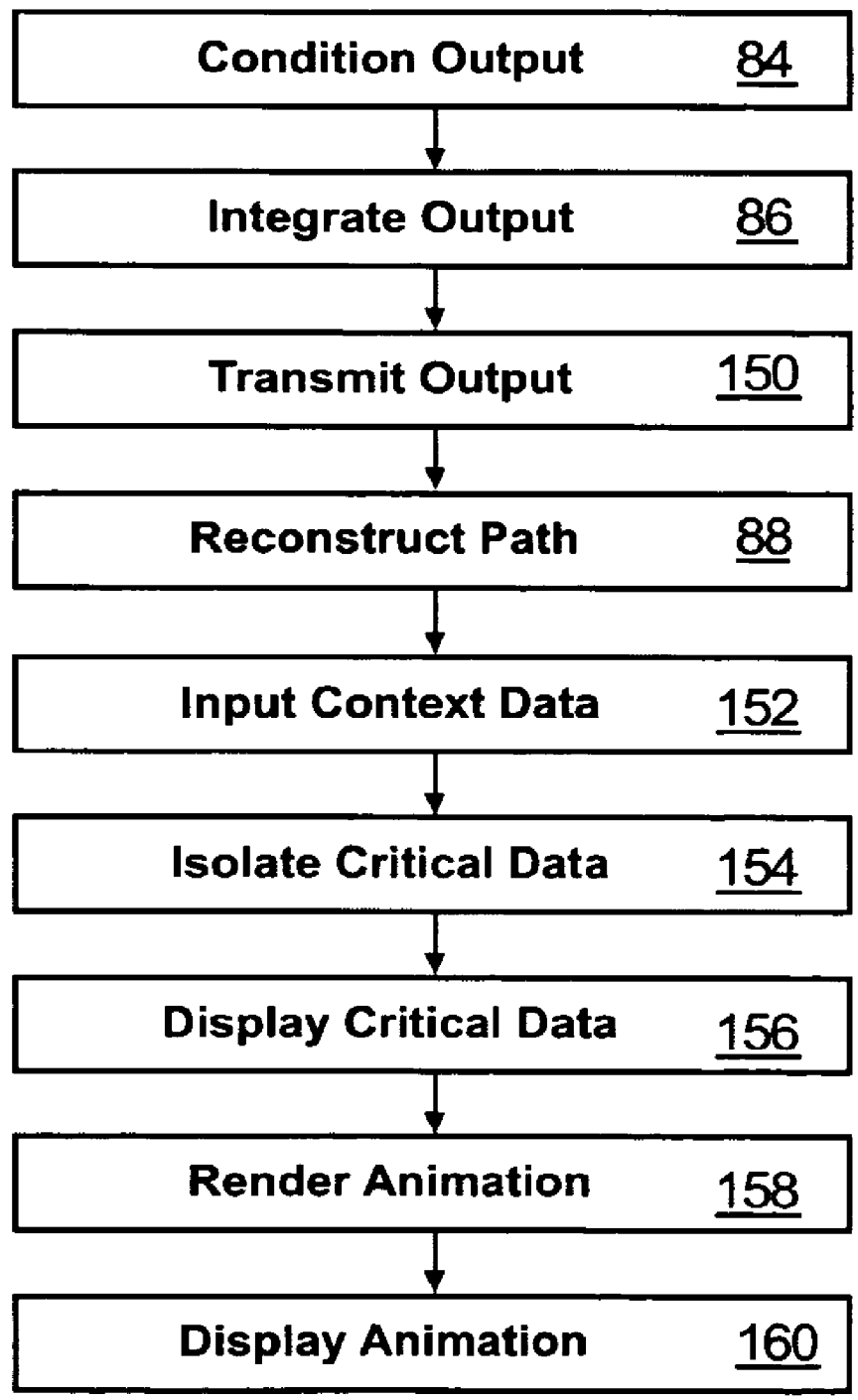
FIG. 12 is a process flow diagram of a method for using an embedded accelerometer array in accordance with the invention.

Referring to FIG. 12, a method 80 may be modified as illustrated for use with a ski 120. For example, the output of the array 50, or of some step of the processing of the array output, may be transmitted 150 from the array 50 to another device. For example, the computer 12 may be remote from the array. Transmitting 150 the output may be accomplished by means of wires or wireless transmission.

Context data may be input 152 to a computer to enable interpretation of the reconstruction of the path of the array 50. For example, a model of the ski to which the array 50 is attached may be input. Critical data 154 may be isolated from the reconstructed path. For example, the top speed or maximum altitude obtained may be determined based on the reconstructed path. In some embodiments, identifying a maximum altitude may include analyzing which maximum altitude is of significance. For example, a skier performing a jump will start at the top of a hill, descend the hill to gather speed, engage a ramp, ascend through the air until an apex is reached, and then descend. The starting position of the skier will likely be the absolute maximum, with the apex of the jump being a local maximum. Accordingly, a large parabolic portion of the path may be isolated to identify the region where the maximum altitude is to be found. Similarly, curve fitting and filtering may isolate features of interest.

The critical data isolated in step 154 may be displayed in step 156. For example, a top speed or maximum altitude may be displayed on the top of a ski or a display secured to a skier's mask 142. Alternatively, the critical data identified in step 154 may be stored to be displayed 156 at a later time.

In some embodiments, an animation of a rider's, boarder's, or skier's path may be rendered 158 using the context data of step 152 and the reconstructed path of the array 50. Rendering 158 an animation may include applying translations and rotations to a digital model of a ski, bike, board, or the like. The animation may then be displayed 160 to a user in order to provide feedback to improve technique or performance.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A homing display method comprising:
   connecting to a user a portable, self-contained apparatus comprising a display, a processor executing relative positioning software, and an array of accelerometers operably connected to the processor and detecting acceleration of the user in at least two of transverse, longitudinal, and lateral directions;
   moving the apparatus and user along an indirect path away from a fixed starting point;
   providing, by the array, a signal to the processor substantially continuously during substantially all the moving, while the processor is operating;
   calculating, by the relative positioning software based exclusively on the signal, substantially continually during the substantially all of the moving, a vector pointing to the fixed starting point;
   displaying, by the display, substantially continually during the moving a sensible signal directing the user directly along the vector toward the fixed starting point.

2. The method of claim 1, wherein the display is selected from a liquid crystal display, a video device, an analog device, and an audio device.

3. The method of claim 2, wherein the director is selected from a pointer on the liquid crystal display, a pointer on the video device, a needle on the analog device, and an audible signal from the audio device, designating a direction.

4. The method of claim 3, wherein the apparatus further comprises a band.

5. The method of claim 4, wherein the connecting comprises securing the band to the user.

6. The method of claim 5, wherein the connecting further comprises securing the band around a wrist of the user.

7. The method of claim 6, wherein the processor executes a signal processing module.

8. The method of claim 7, further comprising filtering, by the signal processing module, the signal.

9. The method of claim 8, further comprising converting, by the signal processing module, the signal.

10. The method of claim 9, wherein the converting comprises at least one of analog-to-digital conversion and digital-to-analog conversion.

11. A homing display method comprising:
    selecting a self-contained apparatus comprising a processor and an array of accelerometers, the array of accelerometers detecting acceleration of the apparatus in at least two of transverse, longitudinal, and lateral directions;
    moving the apparatus and user along an indirect path away from a fixed starting point;
    providing, by the array, signal to the processor substantially continuously during substantially all of the moving while the processor is operating;
    calculating, by the processor based exclusively on the signal, substantially continually during substantially all of the moving while the processor is operating, a vector pointing to the fixed starting point;
    communicating, by the apparatus, substantially continually during the moving a sensible signal directing the user directly along the vector toward the fixed starting point.

12. The method of claim 11, further comprising securing the apparatus to the user.

13. The method of claim 12, wherein the securing comprises securing the apparatus to a wrist of the user.

14. The method of claim 11, further comprising filtering, by the processor, the signal.

15. The method of claim 11, further comprising converting, by the processor, the signal.

16. The method of claim 15, wherein the converting comprises at least one of analog-to-digital conversion and digital-to-analog conversion.

17. A method comprising:
    providing a self-contained apparatus comprising a processor, a display, and an array of inertial sensors, all operably connected;
    connecting the apparatus to a user;
    moving the apparatus and user along an indirect path away from a fixed starting point;
    providing, by the array, signal to the processor substantially continuously during the moving substantially all the time that the processor is operating and moving;
    executing, by the processor, an executable comprising a relative positioning system calculating substantially continuously during the moving a current position of the user relative to the fixed staring point based exclusively on the signal; and
    communicating, by the display, to the user substantially continuously during the moving a direction back to the fixed staring point.

18. The method of claim 17, wherein the connecting comprises securing the apparatus to a wrist of the user.

19. The method of claim 17, wherein the communicating comprises displaying an arrow pointing back to the fixed starting point.

20. The method of claim 17, wherein the moving comprises moving the apparatus and user within an underwater environment.

* * * * *